Oct. 27, 1931.  J. A. BESAL ET AL  1,829,035
BOARD CONTROL MECHANISM
Filed March 22, 1929   3 Sheets-Sheet 1
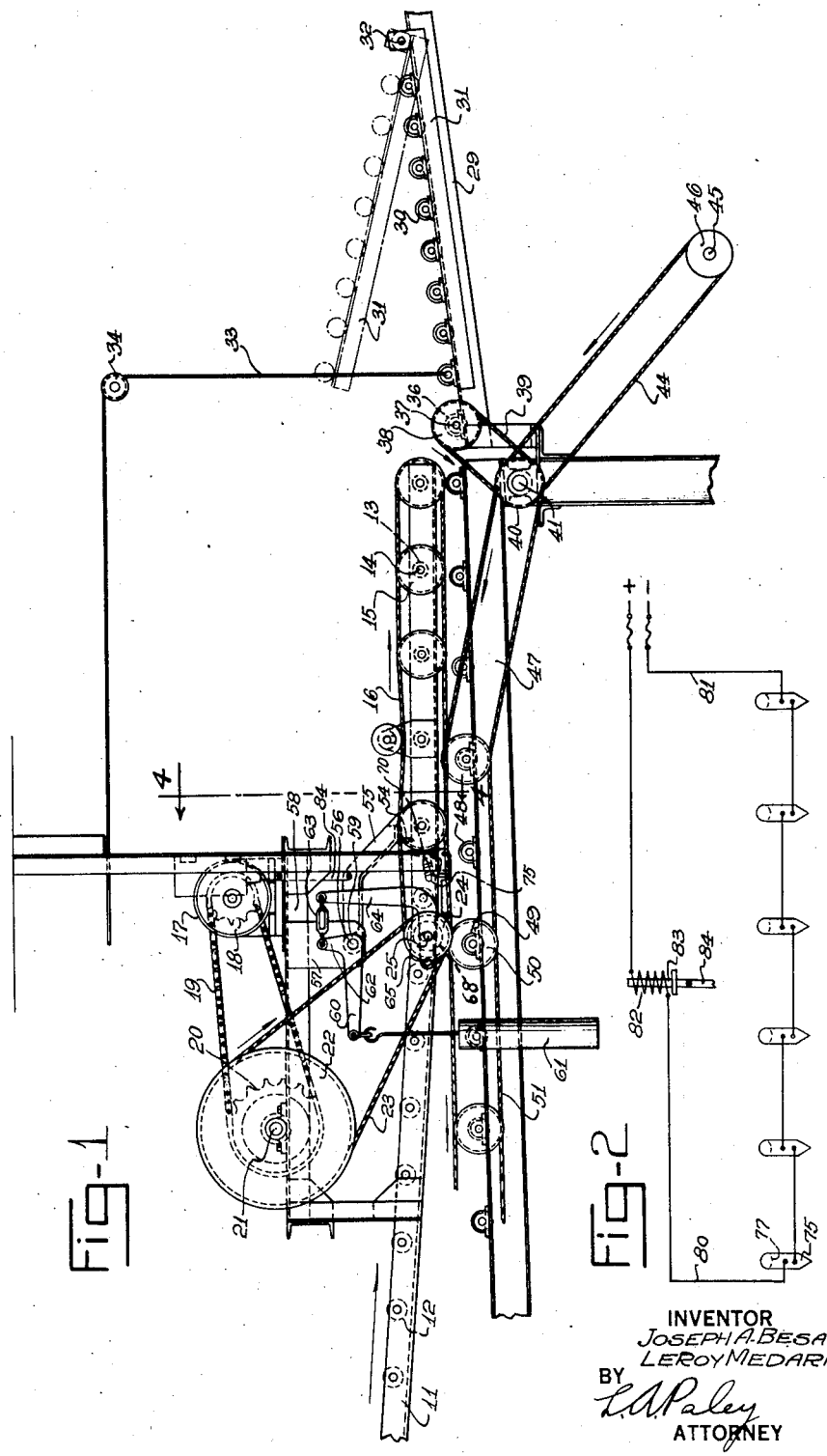
INVENTOR
JOSEPH A. BESAL.
LEROY MEDARIS.
BY
ATTORNEY

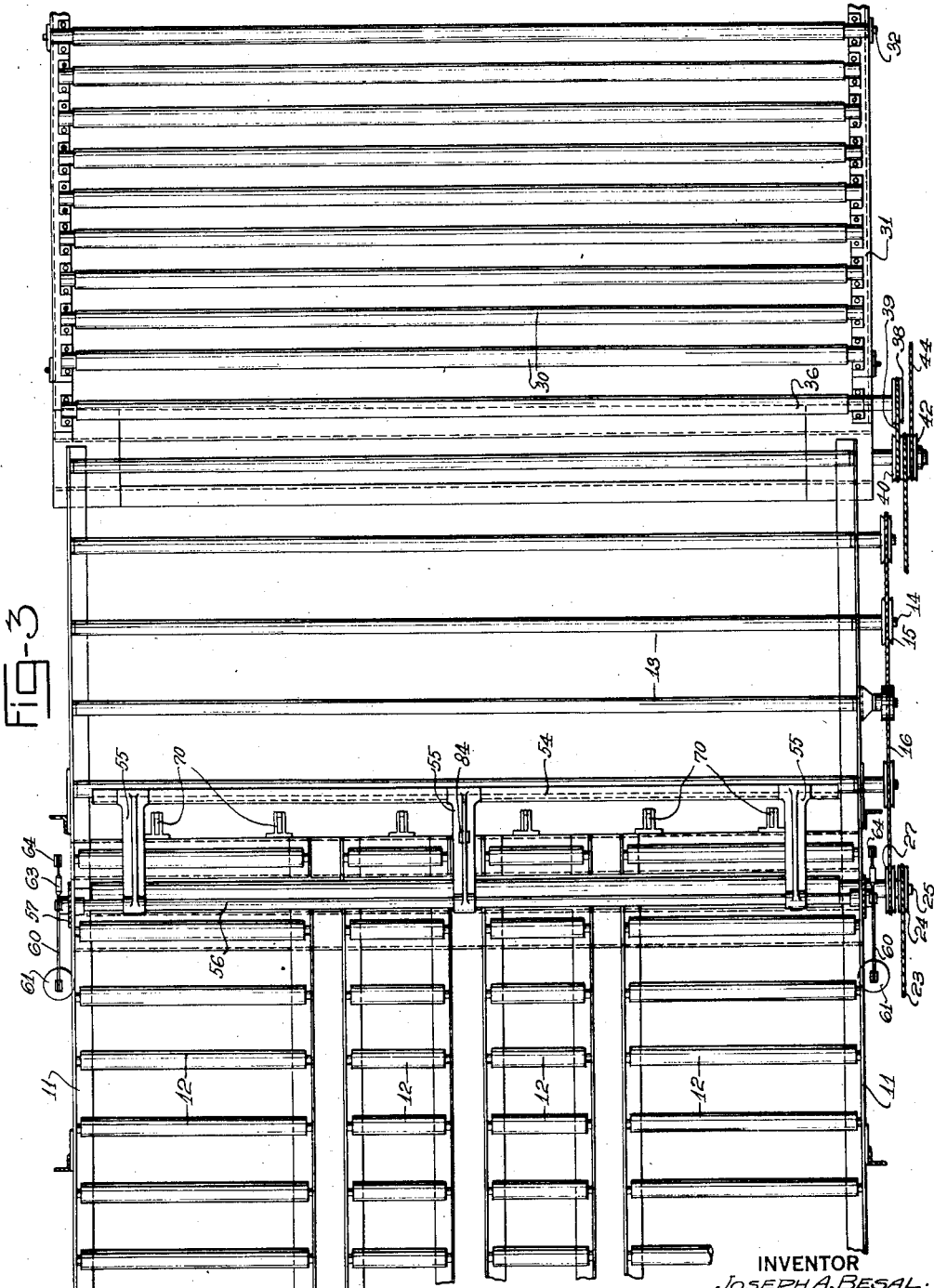

Oct. 27, 1931.  J. A. BESAL ET AL  1,829,035
BOARD CONTROL MECHANISM
Filed March 22, 1929   3 Sheets-Sheet 3
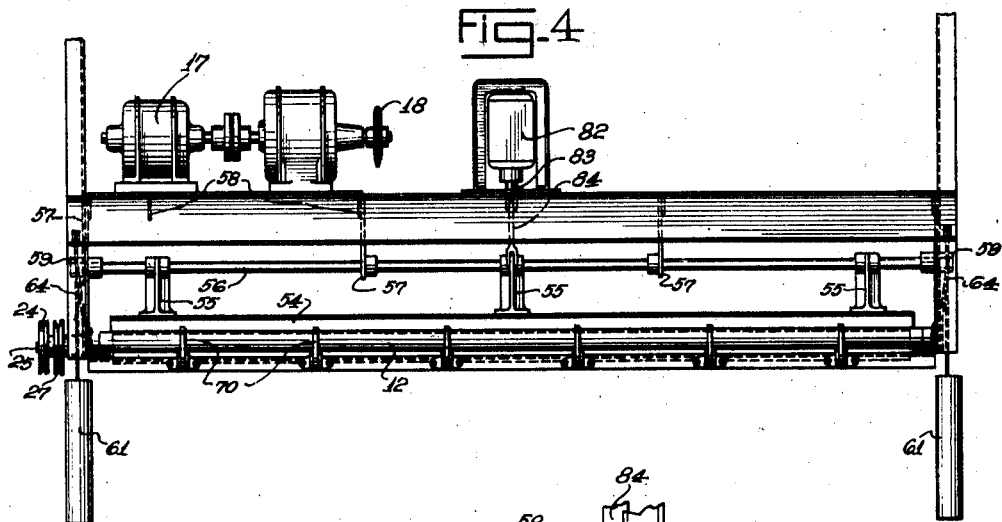
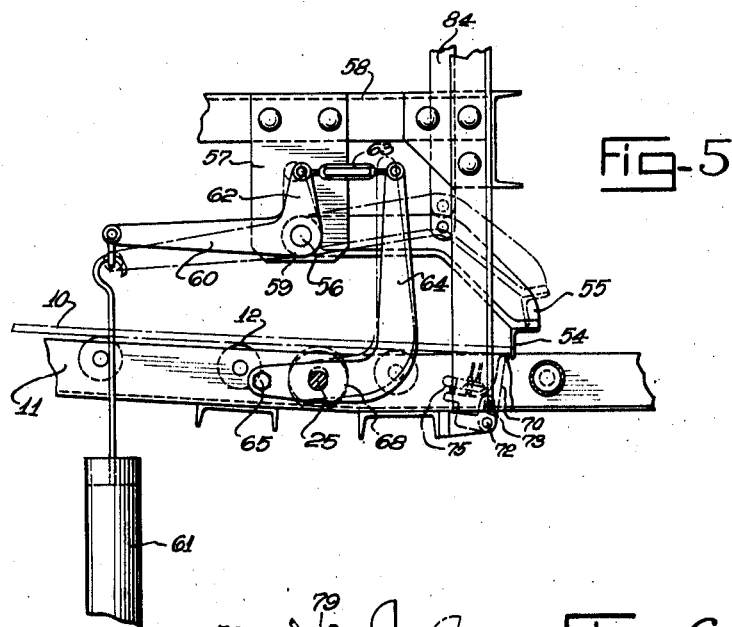
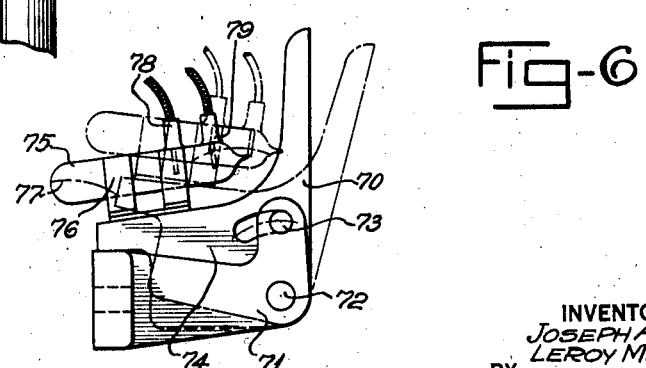
INVENTOR
JOSEPH A. BESAL
LEROY MEDARIS
BY
ATTORNEY Patented Oct. 27, 1931

1,829,035

UNITED STATES PATENT OFFICE

JOSEPH A. BESAL AND LE ROY MEDARIS, OF CHICAGO, ILLINOIS, ASSIGNORS TO UNITED STATES GYPSUM COMPANY, OF CHICAGO, ILLINOIS, A CORPORATION OF ILLINOIS

BOARD CONTROL MECHANISM

Application filed March 22, 1929. Serial No. 349,025.

This invention relates to control devices for sheets or boards of material, and has reference more particularly to a device for retaining plaster boards abreast on a conveyor until a predetermined number of plaster boards are lying abreast, whereupon all of the plaster boards are simultaneously released to move along the conveyor.

It is standard practice in the manufacture of boards for building purposes, such as plaster board, wall board, fiber board and the like, to form said boards on a conveyor, cut the boards to predetermined lengths and then pass said boards through continuous dry kilns for the purpose of reducing the moisture content thereof. Commercial wall boards, plaster boards and the like are usually made with a core of set gypsum faced on each surface with a layer of heavy paper. In order to reduce the floor space required, and especially the length of the drying kiln, it is the practice to make the drying kilns of sufficient width so that several boards abreast can pass through said drying kilns simultaneously. It is also standard practice to have the drying kilns located underneath the setting conveyor where the gypsum core is allowed to set to solid form so as to economize on floor space, with the result that the direction of movement of the plaster boards is reversed to transfer same from the setting conveyor to the drying kilns. Furthermore, since the gypsum boards are usually, but not always, produced in a single line of cut boards, it is desirable to have a mechanism for forming these boards several abreast on the conveyor prior to entering the kilns.

An object of this invention, therefore, is to provide a mechanism for forming several gypsum boards abreast upon a conveyor prior to entering the drying kilns.

Another object of the invention is to provide a mechanism of the class described which is arranged to operate electrically so that when a predetermined number of plaster boards have been arranged abreast upon a conveyor, said electrical means will be actuated to release all of the boards simultaneously for further travel through the drying kilns; also to improve board control devices in other respects hereinafter specified and claimed.

Reference is to be had to the accompanying drawings forming a part of this specification, in which Fig. 1 is a fragmentary elevation of our improved board control device, Fig. 2 is a diagram of the electrical circuit used in the operation of our device, Fig. 3 is a fragmentary plan view of the board control device, Fig. 4 is a sectional elevation of the device on line 4—4 of Fig. 1, Fig. 5 is a fragmentary elevation on a large scale of some of the operating mechanism, and Fig. 6 is a large scale elevation of one of the mercury switches for operating the device.

According to the standard practice, the gypsum or other building boards pass along a setting conveyor 11 or other suitable conveyor where the gypsum core material is allowed to set to solid form. This conveyor 11 may be in the form of a roller conveyor having rollers 12 along which the boards travel under the action of gravity, the conveyor 11 being usually inclined at an angle to the horizontal. The rollers 12 may be positively driven, if desired, so as to cause the positive movement of the boards at all times. Such driven rollers are shown at 13 in which said rollers are mounted on shafts 14 having pulleys 15 secured thereto, said pulleys being driven in any suitable way, such as by a flexible rope 16. Any source of power may be provided for causing the rotation of the driven rollers 13 such as the motor 17 having a sprocket wheel 18 connected by chain 19 to a sprocket 20 mounted on a countershaft 21. A pulley 22 on shaft 21 is connected by a belt 23 to a pulley 24 mounted upon a shaft 25. A second pulley 27 is also secured on the shaft 25 and is connected by the belt 16 to the other pulleys 15.

As the boards 10 leave the conveyor 11, they are received by an inclined conveyor 29 having rollers 30 for facilitating the movement of the boards under the action of gravity. The rollers 30 are rotatably mounted upon a frame 31 which is pivoted by means of rod 32, to the conveyor 29 so that said frame can be swung upwardly by means of a rope 33 attached thereto, said rope passing around a pulley 34 and extending to the opposite end of the machine convenient for actuation by the operator of the machine. The purpose of mounting the frame 31 for pivotal movement is to permit any defective boards to be removed by the operator and to cause said defective boards to fall downwardly to a discharge point without continuing on the conveyor system leading to the drying kiln.

The first quality boards, after leaving the conveyor 11, drop onto a driven roller 36 which is mounted upon a shaft 37, the latter having a pulley 38 connected by a belt 39 to a pulley 40 on a countershaft 41. A second pulley 42 is also located on the shaft 41 and is connected by a belt 44 to any source of power such as a drive shaft 45 provided with a pulley 46. Thus, when the boards fall upon the roller 36, their direction of movement is reversed and they are then moved onto a conveyor 47 which is provided with rollers 48, some of which, such as rollers 49, are positively driven through pulley 50 and belt 51 leading from the shaft 41. The conveyor frame 47 is pivotally mounted on the shaft 41, and is operated by a mechanism not shown so as to rock to different angles with the horizontal thus delivering plaster boards to different decks in a multi-decked drying kiln of usual construction.

One of the salient features of our invention is that we provide mechanism at one point along the path of travel of the board so as to check the forward movement of the boards until a predetermined number of boards have come into position upon the conveyor 11 where all of the boards lie abreast, one of the other. Our mechanism then trips and releases all of the boards at one time so that they may continue their travel into the drying kiln. At some point along the setting conveyor 11 a suitable cutoff device is provided which cuts the strips of board into predetermined lengths and then a transfer car is provided which spreads the boards out over the full width of the conveyor 11.

Our mechanism for checking, stopping or arresting the forward movement of the boards, preferably includes a crossbeam 54 which extends transversely across the conveyor 11 and normally lies in the path of travel of the boards as they move along said conveyor. This beam 54 may be in the form of an angle bar, and is preferably secured to levers 55, the latter being secured to a shaft 56 which is rotatably mounted in suitable bearing bracket 57 secured to the framework 58 of the machine. Bell crank levers 59 are also secured to the shaft 56, one arm 60 of each of said levers being provided with a counterweight 61 which balances the weight of beam 54 and levers 55. The other arms 62 of the levers 59 are connected by adjustable links 63 to a lever 64 which is preferably L-shaped and is pivotally mounted on one end of its lower arm on a pivot bolt 65. The transversely extending shaft 25 is rotatably supported by the lever 64 and a roller 68 is secured to said shaft, said roller being provided with the pulley 24 connected by belt 23 to driving pulley 22. Thus when lever 64 is rocked in a counter clockwise direction as seen in Fig. 5, the driven roller 68 is moved upwardly to contact with the lower surface of the boards lying upon roller 12.

In order to cause the intermittent actuation of levers 55, 59 and 64, so as to move beam 54 upwardly and release the boards for continuous movement along conveyor 11, a series of switch levers 70 is pivotally mounted upon brackets 71 by means of pins 72, said brackets being secured to the framework of the machine. A pin and slot connection 73 between the lever 70 and the bracket 72 limits the rocking movement of lever 70 about pin 72. One arm 74 of the lever 70 normally rests upon the bracket 71 to limit the counterclockwise movement of said lever, and a sealed glass tube 75 is secured by clips 76 to the lever arm 74, said tube containing a globule 77 of mercury which is adapted to make contact with the electrical connectors 78 and 79 when the lever 70 is in its farthest clockwise position. The contacts 78 and 79 are sealed into the glass tube 75 and electrical connectors 80 and 81 lead from said contacts through an electrical circuit shown in Fig. 2. All of the mercury switches are arranged in series and a solenoid 82 is also included in series in said circuit, said solenoid being provided with a core piece 83 which is connected by link 84 to the lever 55. Thus when the mechanism is designed to interrupt the movement of the boards until six boards have come into position abreast of each other, six of the mercury switches are arranged upon the machine so that all of the switches have to be closed before the solenoid is actuated and the cross beam 54 is moved upwardly, while at the same time the roller 68 is moved into contact with the lower surface of the boards so as to cause said boards to move ahead. It should be understood that any other suitable type of switch or releasing device may be used to accomplish similar results, and furthermore that the board aligning or arresting mechanism may be located at any suitable position along the path of travel of the boards.

In operation boards 10 move along the conveyor 11 until they come into contact with transversely extending beam 54 which stops their travel until a predetermined number of boards have been lined up abreast along said beams. Just before the boards engage the beam 54 each individual board strikes a switch lever 70 which closes the corresponding mercury switch 75 until all of said mercury switches are closed which causes the actuation of solenoid 82 and the vertical movement of core 83 and link 84. The actuation of link 84 moves lever 55 in a counter clockwise direction and also moves levers 59 and 64 in a counter clockwise direction. Roller 68 is lifted upwardly by lever 64 into contact with the lower surface of the boards and beam 54 is also moved upwardly to release the boards. The boards are advanced along the conveyor 11 until they are deposited upon conveyor rollers 30 with the lower edge of said board dropping onto roller 36 which reverses the direction of movement of said board onto conveyor 47 which has rollers 48 and 49. The conveyor 47 tilts about pivot 41 and directs the plasterboard into the proper decks of the drying kiln not shown.

While the foregoing description constitutes a practical embodiment of our invention, we do not limit ourselves precisely to these details since, manifestly, the same may be considerably varied without departing from the spirit of the invention as defined in the appended claims.

Having thus described our invention, we claim as new and desire to secure by Letters Patent:—

1. In a sheet-handling mechanism, a conveyor adapted to convey sheets of material, means positioned adjacent said conveyor adapted to stop the motion of said sheets until a predetermined number of said sheets are lined up abreast on said conveyor, and automatic means for releasing said sheets simultaneously for further movement along said conveyor when said predetermined number of sheets have lined up abreast.

2. In a board handling mechanism, a conveyor adapted to move boards of material along the predetermined path, means for arresting the movement of said boards along said conveyor until a predetermined number of boards have lined up abreast on said conveyor, and means actuated by said boards to cause the movement of said arresting means and permit said boards to be released simultaneously for further movement along said conveyor.

3. In a board handling mechanism, a conveyor adapted to move said boards along a predetermined path, an arresting member positioned adjacent said conveyor, said member being adapted to stop the movement of said boards until a plurality of said boards are lined up abreast, and a plurality of electrical switches associated with said conveyor and adapted to be actuated by said boards so as to control the movements of said member thus releasing a plurality of boards simultaneously for further movement along said conveyor.

4. In a board handling mechanism, a conveyor adapted to move boards along a predetermined path, an arresting member movably supported adjacent said conveyor adapted to stop the movement of said boards, and an electrical switch associated with said conveyor and adapted to be actuated by said boards so as to release a plurality of said boards simultaneously for further movement along the conveyor.

5. In a board handling mechanism, a conveyor adapted to move boards along a predetermined path, an arresting member movably positioned adjacent said conveyor and adapted to stop the movement of said boards along said conveyor, control means adapted to be actuated by a board so as to cause the movement of said member and release a plurality of boards simultaneously for further movement along said conveyor, and means for causing the movement of said boards along said conveyor.

6. In a board handling mechanism, a conveyor adapted to move boards along a predetermined path, an arresting member for stopping the movement of said boards along said conveyor, a rock shaft associated with said conveyor, and means actuated by the boards for rocking said shaft and removing said member from a plurality of boards so as to permit the continued movement of said boards along said conveyor.

7. In a board handling mechanism, a conveyor adapted to move boards from one position to another, an arresting member positioned adjacent said conveyor and adapted to stop the movement of boards along said conveyor, a plurality of electrical switches associated with said conveyor and connected in series, a solenoid connected in circuit with said switches, and means associated with said solenoid for moving said member and releasing a plurality of boards simultaneously when said switches are closed by said boards.

8. In a board handling mechanism, a roller conveyor adapted to move boards along in a predetermined path, an arresting member associated with said conveyor, a solenoid, and means controlled by the movement of said boards for intermittently energizing said solenoid so as to remove said member from said boards for continued movement of said boards along said conveyor.

9. In a board handling mechanism, a roller conveyor adapted to move boards along a predetermined path, a driven roller associated with said conveyor, said roller being normally out of contact with the boards moving along said conveyor, means for stopping the movement of said boards along said conveyor, a solenoid, and means for periodically energizing said solenoid so as to release the boards and move said driven roller into contact with said boards to accomplish the continued movement of said boards along said conveyor.

10. In a board handling mechanism, a conveyor adapted to move boards from one position to another position, an arresting member positioned adjacent said conveyor, and a mercury switch associated with said member and adapted to be actuated by the movement of one of said boards so as to cause said member to be removed from said boards for permitting further movement of said boards along said conveyor.

11. In a board handling mechanism, a conveyor adapted to move boards along a predetermined path, an arresting member associated with said conveyor adapted to stop the movement of said boards until a plurality of boards have been lined up abreast on said conveyor, a plurality of mercury switches connected in series adjacent said members and adapted to be actuated by said boards, and connecting means between said switches and said member so as to remove said member from said boards when a plurality of boards have been lined up abreast so that said boards continue their movement along said conveyor.

JOSEPH A. BESAL.
LE ROY MEDARIS.